Oct. 28, 1947.　　　　H. G. CONNER　　　　2,429,805
TAIL GATE AND FASTENER THEREFOR
Filed May 21, 1945　　　2 Sheets-Sheet 1

Inventor
Harvey G. Conner,
By Clarence A. O'Brien
and Harvey B. Jacobson
Attorneys Oct. 28, 1947.  H. G. CONNER  2,429,805
TAIL GATE AND FASTENER THEREFOR
Filed May 21, 1945  2 Sheets-Sheet 2
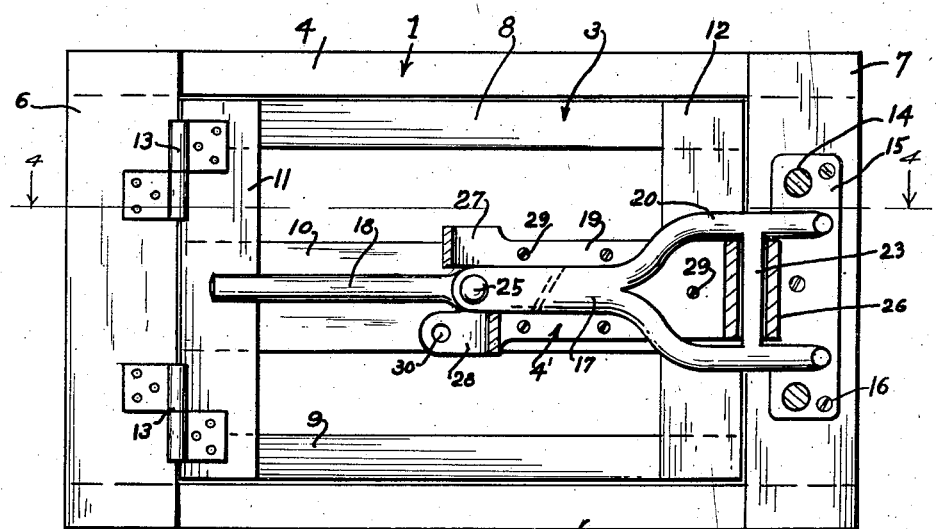
Fig. 3.
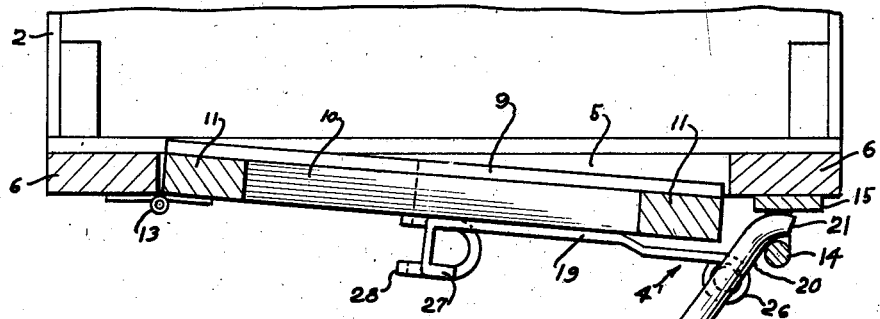
Fig. 4.
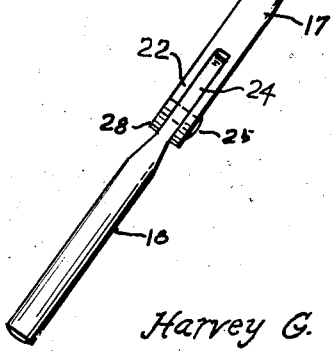
Inventor
Harvey G. Conner,
By Clarence A. O'Brien
and Harvey B. Jacobson
Attorneys Patented Oct. 28, 1947

2,429,805

UNITED STATES PATENT OFFICE 2,429,805

TAIL GATE AND FASTENER THEREFOR

Harvey G. Conner, Paisley, Oreg.

Application May 21, 1945, Serial No. 595,040

1 Claim. (Cl. 296—50)

My invention relates to improvements in tail gates for automotive trucks, and the like, and to fasteners for such gates.

The principal object of the invention is to equip automotive trucks, or similar vehicles, used for transporting livestock, with a tail gate unit of simple form and inexpensive construction which is proof against being accidentally opened and against freezing shut, and which is easy to fasten and unfasten particularly when pressure is being exerted against the same from the inner side of the gate.

Another object is to provide a gate and a fastener for the purpose above set forth which is strong, involves few parts, and will not readily get out of order.

Other and subordinate objects, also comprehended by my invention, together with the precise nature of my improvements and the manifold advantages thereof, will be readily understood when the succeeding description and claim are read with reference to the drawings accompanying and forming part of this specification.

Figure 1:
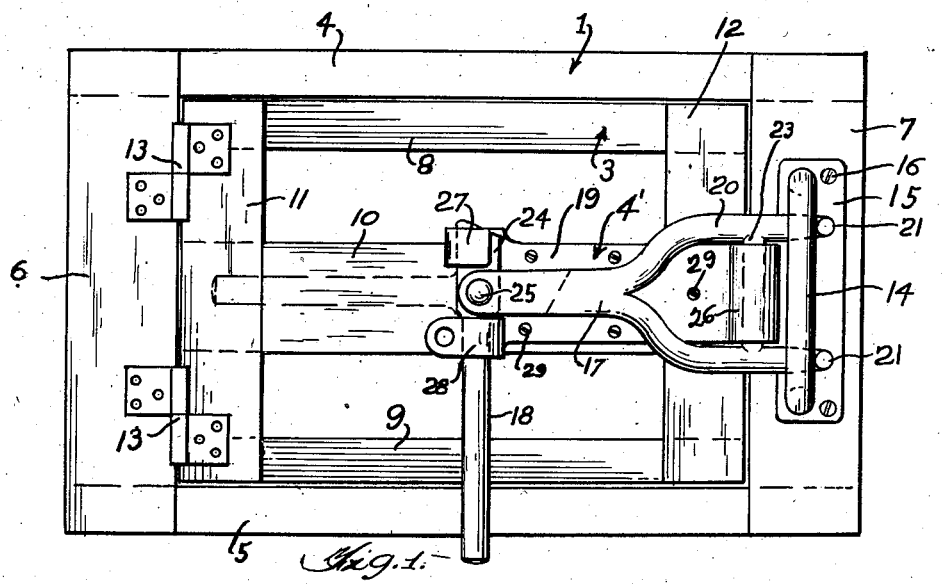
Figure 2:
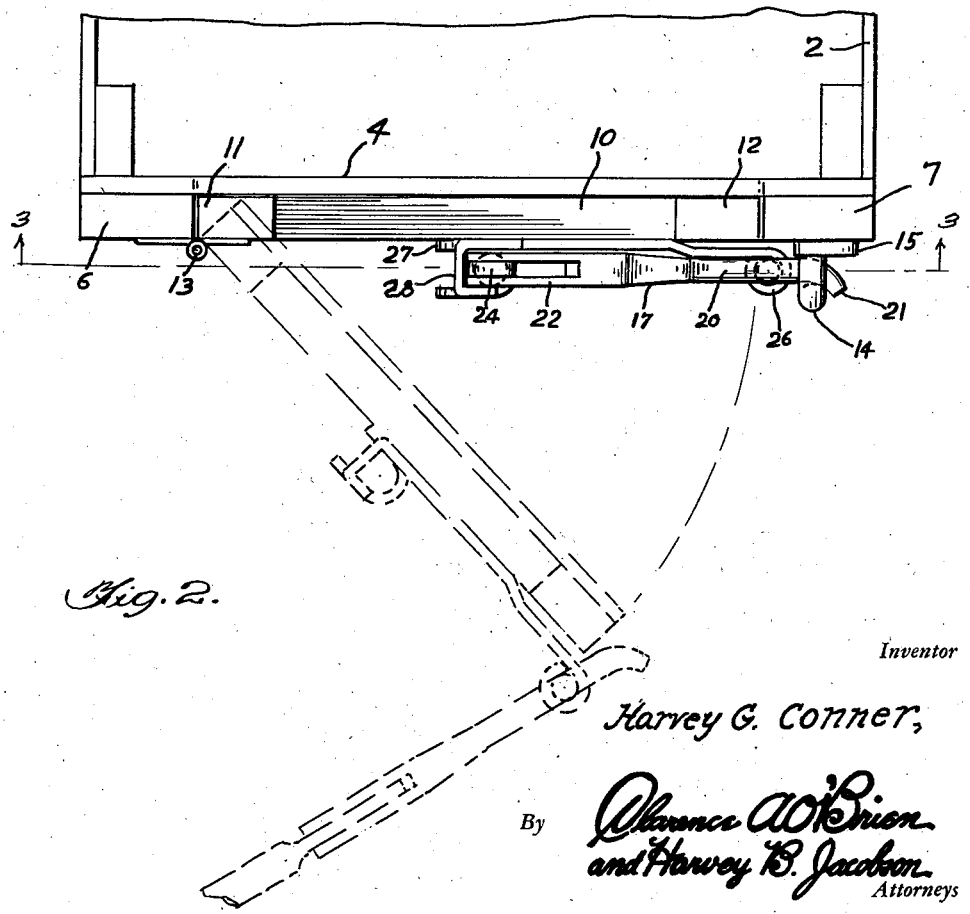

In said drawings:

Figure 1 is a view in rear elevation of my improved tail gate and fastener in a preferred embodiment thereof, Figure 2 is a view in plan with the gate shown open in broken lines, Figure 3 is a view in longitudinal section taken on the line 3—3 of Figure 2, and Figure 4 is a view in longitudinal section taken on the line 4—4 of Figure 3, and illustrating the fastener unfastened and the gate partly opened.

Reference being had to the drawings by numerals, according to my invention, as shown, a frame 1 is provided for attachment in any suitable manner to the tail end of a truck body 2, a gate 3 for closing said frame, and fastener means 4' for said gate.

The frame 1 comprises a pair of top and bottom bars 4, 5 and a pair of side bars 6, 7 overlying the ends of said bars 4, 5 on the rear side thereof and suitably fixed thereto.

The gate 3 comprises top, bottom and an intermediate bar 8, 9, 10, respectively, with side bars 11, 12, and fitted within the confines of the frame 1. The gate 3 is suitably hinged to the frame side bar 6, as at 13, to open outwardly of the frame 1 and body 2.

The fastener 4' comprises an elongated, staple-like keeper 14 having a base plate 15 secured by screws 16 to the frame side bar 7 with the keeper 14 in upright position, a fastener lever 17 for cooperation with the keeper 14 to maintain the gate 3 closed, and a gravity latch 18 for the fastener lever 17, also an attaching plate 19 for said lever 17. The fastener lever 17 comprises a forked outer end 20 adapted to fit in the keeper 14 with out-turned terminals 21 hooking under said keeper, a bifurcated inner end 22, and a cross bridge piece 23 connecting the tines of the forked end 20 inwardly of the terminals 21. The gravity latch 18 has the form of a handle bar provided with a flattened inner end 24 pivoted, as at 25, in said bifurcated end 22 to swing vertically thereon, in the plane thereof, into either alignment with said lever 17 or to depend therefrom in right angular relation thereto. In the depending position of said gravity latch 18, the flattened end 24 extends above the fastener lever 17. The attaching plate 19 is provided with a vertical front end barrel 26 fitting in the forked end 20 of the fastener lever 17 with the bridge piece 23 rotatable therein. At the rear end thereof, said plate 19 is provided with a pair of upper and lower, oppositely opening, staple-like latch keepers 27, 28 between which the bifurcated end 22 of the fastener lever 17 is adapted to swing when said lever 17 is in fastening position, and into which the gravity latch 18 is adapted to fit when said gravity latch is swung into the described depending position. Screws 29 secure said plate 19 to the rear side of the gate 3 with the fastener lever 17 swingable in the barrel 26 horizontally. A suitable aperture 30 is provided in the lower keeper 28 for the insertion of the shackle of a padlock, not shown, therethrough to block swinging of the gravity latch out of the keepers 27, 28.

Referring now to the use and operation of the invention. With the gate 3 suitably closed, part way, as shown in Figure 4, and the gravity latch 18 swung on the fastener lever 17 into alignment therewith, said lever 17 is swung, by the gravity latch 18 as a handle, to insert the terminals 21 of the forked end 20 in the keeper 14, as shown in said Figure 4. The fastener lever 17 is then swung, by means of said gravity latch 18, toward the gate 3 to interpose the bifurcated end 22 thereof between the upper and lower keepers 27, 28, as shown for instance in Figure 3. During such swinging of the fastener lever 17, the terminals 21 fulcrum against the keeper 14 to apply leverage to the gate 3 and fully close the same. The gravity latch 18 is next swung downwardly on the pivot 25 into right angular depending relation to said lever 17, in which position said gravity latch is swung into said keepers 27, 28 and the fastener and gate latched. When the gravity latch 18 is unlatched, in a manner which will be clear, the fastener lever 17 may be swung counter-clockwise, as viewed in Figure 4, to withdraw the terminals 21 from the keeper 14 so that the gate 3 may be fully opened. In this operation, said terminals 21 fulcrum against the base plate 15 and serve to pry the gate 3 part way open. The advantage of this will be apparent, particularly in connection with stuck or frozen gates.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A tail gate structure for a truck body comprising a frame adapted to be fixed to said body, a gate for closing said frame hinged at one side to one side of the frame, a staple-like keeper fixed to said frame at the other side thereof, a fastener lever having a forked end with hooked terminals for insertion in said keeper, means to swingably mount said lever on said gate for swinging of said terminals into and out of said keeper, and a gravity latch for holding said lever against swinging when said terminals are inserted into said keeper, said keeper including a base plate, said terminals fulcruming between and against said plate and keeper when said lever is swung, to thereby exert leverage against said gate in opening and closing the same.

HARVEY G. CONNER.

REFERENCES CITED

The following references are of record in the file of this patent:

UNITED STATES PATENTS

| Number | Name | Date |
| --- | --- | --- |
| 144,429 | Baird et al. | Nov. 11, 1873 |
| 369,894 | Tichenor et al. | Sept. 13, 1887 |
| 490,333 | Anderson | Jan. 24, 1893 |
| 812,107 | Wirfs | Feb. 6, 1906 |
| 1,355,253 | Ostul | Oct. 12, 1920 |
| 1,716,343 | Langren | June 4, 1929 |